US012765535B2

(12) United States Patent
Davidowitz

(10) Patent No.: US 12,765,535 B2
(45) Date of Patent: Oct. 20, 2026

(54) GRASSHOPPER HARVESTING SYSTEM

(71) Applicant: ARIZONA BOARD OF REGENTS ON BEHALF OF THE UNIVERSITY OF ARIZONA, Tucson, AZ (US)

(72) Inventor: Goggy Davidowitz, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 136 days.

(21) Appl. No.: 18/557,472

(22) PCT Filed: Apr. 28, 2022

(86) PCT No.: PCT/US2022/026786
§ 371 (c)(1),
(2) Date: Oct. 26, 2023

(87) PCT Pub. No.: WO2022/232430
PCT Pub. Date: Nov. 3, 2022

(65) Prior Publication Data

US 2024/0237629 A1 Jul. 18, 2024

Related U.S. Application Data

(60) Provisional application No. 63/181,953, filed on Apr. 29, 2021.

(51) Int. Cl.
*A01M 5/08* (2006.01)

(52) U.S. Cl.
CPC .................................... *A01M 5/08* (2013.01)

(58) Field of Classification Search
CPC ................................. A01M 5/08; A01M 5/04
See application file for complete search history.

(56) References Cited

U.S. PATENT DOCUMENTS 2,517,292 A * 8/1950 Dewey .................... A01M 5/08
43/142
2,864,292 A * 12/1958 Elliott .................... A01B 41/06
172/58

(Continued)

FOREIGN PATENT DOCUMENTS

CN 2105840 U * 6/1992
CN 111587866 A * 8/2020
WO WO-2007146332 A2 * 12/2007 ............ A01M 1/023

OTHER PUBLICATIONS

Translation of CN2105840 (Year: 1992).*
Jones, C.R., (1917) Grasshopper Control. Bulletin 233 of the Agricultural Experiment Station, Fort Collins, CO.

*Primary Examiner* — Magdalena Topolski
(74) *Attorney, Agent, or Firm* — NGUYEN TARBET IP LAW

(57) ABSTRACT

A grasshopper harvesting system for collecting grasshoppers featuring a vehicle, a collection array, a transfer mechanism, and a storage container or shredder. The system can be attached to an existing vehicle such as a tractor, ATV, truck, or a GPS-controlled autonomous vehicle that can be programmed to collect grasshoppers according to a particular desired route of a particular field, to protect crops or for consumption purposes. Further, the system may feature a detachable bin that empties the grasshoppers when the bin is full. The system may collect grasshopper pests in organic fields, reduce locust swarm densities in breeding grounds, and harvest grasshoppers from rangeland. The grasshoppers may either be destroyed or processed as edible insects for food and feed.

17 Claims, 3 Drawing Sheets

(56) References Cited

U.S. PATENT DOCUMENTS

| | | | | | |
|---|---|---|---|---|---|
| 4,683,673 | A * | 8/1987 | Taylor | A01M 5/08 43/139 |
| 4,825,582 | A * | 5/1989 | Szynal | A01M 5/08 43/140 |
| 5,400,543 | A * | 3/1995 | Ideker, Jr. | A01M 5/04 134/21 |
| 6,009,765 | A * | 1/2000 | Forsen | A01M 5/08 73/864.33 |
| 9,532,562 | B2 * | 1/2017 | Ganmor | A01M 5/00 |
| 10,091,981 | B1 * | 10/2018 | Cogley | A01M 1/14 |

* cited by examiner

GRASSHOPPER HARVESTING SYSTEM

CROSS-REFERENCES TO RELATED APPLICATIONS

This application claims benefit of U.S. Provisional Application No. 63/181,953 filed Apr. 29, 2021, the specification (s) of which is/are incorporated herein in their entirety by reference.

STATEMENT REGARDING FEDERALLY SPONSORED RESEARCH OR DEVELOPMENT

This invention was made with government support under Grant No. 2019-67030-28997, awarded by USDA/NIFA. The government has certain rights in the invention.

BACKGROUND OF THE INVENTION

Field of the Invention

The present invention relates to insect harvesting, more particularly to a harvesting system for collecting grasshoppers. The grasshoppers may be collected to protect crops, such as organically-grown crops, for consumption purposes, etc.

Background Art

Grasshoppers are agricultural pests consuming crops and rangeland forage. Some species of grasshoppers have a locust form with swarms that can number in the hundreds of millions that can decimate entire regions. Farmers who farm organically or do not have access to pesticides may be completely at the mercy of these insects. Thus, there exists a present need for a non-chemical way of efficiently removing grasshoppers from a farming environment. All locusts are grasshoppers (with a gregarious phase), but not all grasshoppers are locusts (there are about 27 species of locusts among about 11,000 species of grasshoppers). Here, both swarming and non-swarming are referred to collectively as grasshoppers unless stated otherwise.

Furthermore, environmental efforts have created a demand for an alternative protein source for human consumption. As beef, pork, and chicken protein have significant deleterious environmental effects, there is a need for a complete protein source that provides the same nutrients, that is cheaper to produce, and has a lower environmental impact. Insects have been consumed regularly elsewhere for millennia, and about 80% of countries culturally accept insects as part of their diet. Edible insects are eco-friendly, cost-efficient, and high in protein. Although there is resistance in the West to the consumption of insect foods, edible insect farms and insect-based food product companies are starting to appear across the United States. Currently, insect farms are typically farming their insects in bins indoors.

BRIEF SUMMARY OF THE INVENTION

The present invention features a grasshopper harvesting system for collecting grasshoppers for various purposes. The grasshopper harvesting system may be a stand-alone collection array that harvests the grasshoppers or may be a collection array attachment disposed on a vehicle to move the harvester through the area of interest. The grasshopper harvesting system has different modalities depending on the purpose and environment deployed. In some embodiments, the collection array can be an attachment to the front of a tractor or all-terrain type vehicle (ATV) that can be attached and removed as necessary. The collection array can be attached to a dedicated vehicle for continuous use. In other embodiments, the collection array can be attached to an autonomous vehicle, e.g., a GPS-controlled vehicle, designed to collect grasshoppers from crop fields and rangeland. As an example, the focal field appears on an operator's screen as a satellite image. The operator marks the outside corners of the field and the harvester software calculates a route that covers the whole field. The operator also designates a 'home' location to which the harvester will autonomously return. As the harvester travels along its designated route, grasshoppers perceive it as a predator, jump to escape, and are caught in the collection array. The grasshoppers are transferred from the collection array to a collection cage from where they can be removed for processing as food or shredded and killed.

In some embodiments, the collection cage sits atop a pressure sensor which determines when the cage is 'full' by the weight of the grasshoppers. This weight is predetermined and set by the operator. If full, the harvester autonomously returns to the 'home' location where the operator swaps out the full cage for an empty cage. The harvester then returns to the same point it left its route. The harvester is designed to return to 'home' when its battery runs low so that the operator can replace the low batteries with fully charged batteries, at which point the harvester will return to its set route. The harvester has obstacle sensors to 'learn' where obstacles are located in the field and will subsequently avoid these obstacles as it moves through the field.

In some embodiments, the system further comprises one or more sensors for detecting obstacles or areas in the field to be avoided. The system may incorporate this information to alter its path for subsequent runs in the field.

Without wishing to limit the present invention to any theory or mechanism, it is believed that the system of the present invention is advantageous because the system may be a GPS-controlled autonomous vehicle that can be programmed to collect grasshoppers according to a particular desired route of a particular field.

In some embodiments, the grasshopper harvesting system can draw power from an onboard generator, the power-take-off (PTO) of a tractor or other vehicle, or batteries.

In some embodiments, the collection array is comprised of a backboard and sideboards and a vacuum system. The grasshoppers detect the approaching harvester and jump to escape. With the harvester moving forward at an appropriate speed, the grasshoppers hit the backboard or sideboards and fall into an open tube that is attached to the vacuum system. The vacuum pulls the grasshoppers from the collection array, through hoses or pipes to a collection system. The collection system can be a box that preserves the grasshoppers live until they can be transferred for processing, and/or a shredder device where they can be destroyed and dropped back onto the ground as fertilizer. Because grasshopper nymphs (juveniles) do not fly, the grasshopper harvesting system is best deployed when grasshoppers are still in the nymphal stage. The collection array can be lowered or raised depending on the jump trajectories or vegetation height.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWINGS

The features and advantages of the present invention will become apparent from a consideration of the following detailed description presented in connection with the accompanying drawings in which.

DETAILED DESCRIPTION OF THE INVENTION

Figure 1:
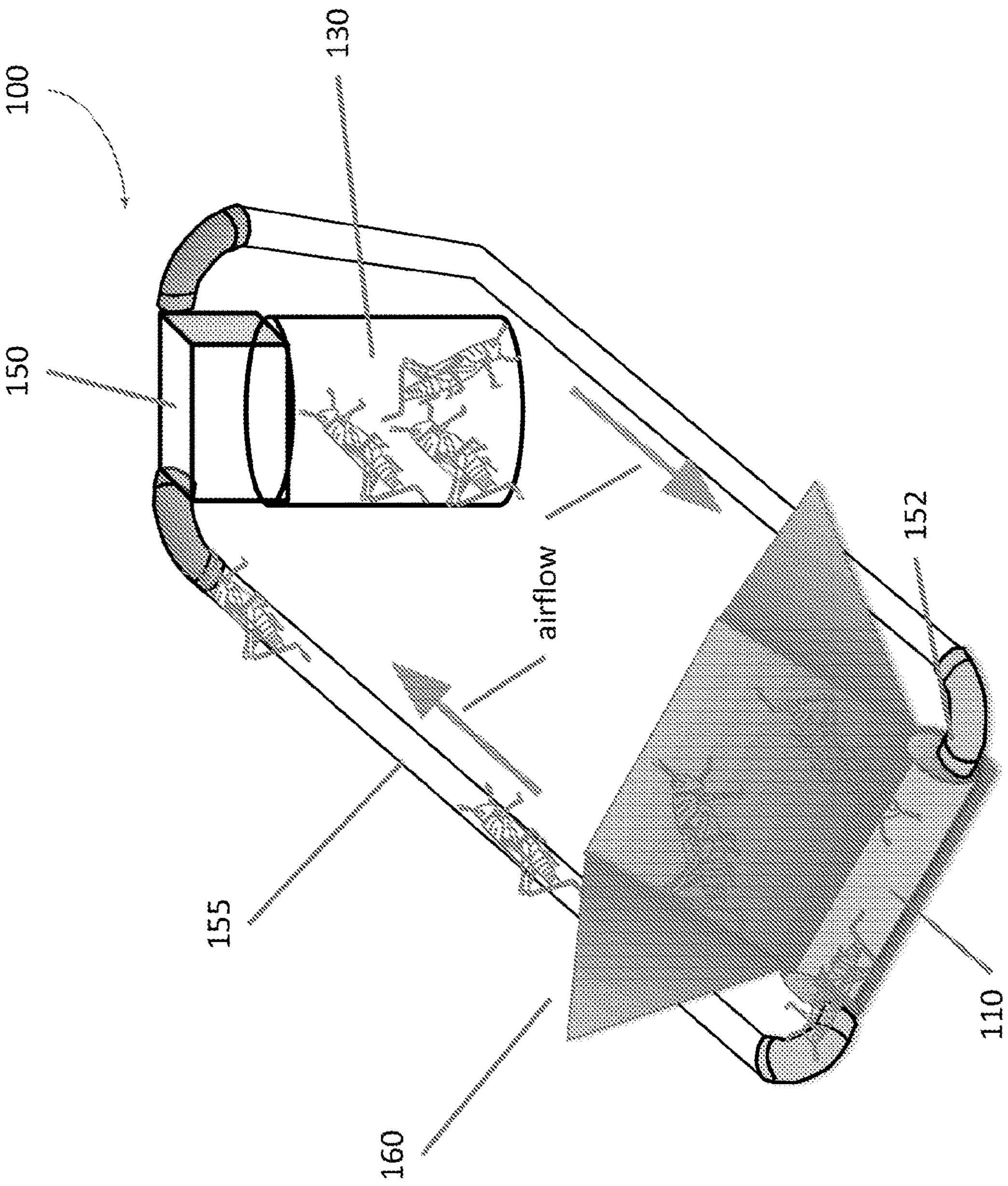
FIG. 1 shows a schematic view of a grasshopper harvesting system of the present invention. The present invention is not limited to the configuration or components in FIG. 1.

Potential applications of the grasshopper harvester: Grasslands comprise about 40% of terrestrial habitats and grasshoppers are the dominant group of insects in grasslands. In one embodiment, the present invention features a mechanized device for the collection of grasshoppers. Four non-limiting target applications for such a device include organic farming, locust swarm mitigation, rangeland management, and grasshopper ranching.

Organic Farmers. The grasshopper harvester may be deployed to remove grasshopper pests from organically grown crop fields. Organic farms do not typically use pesticides and are thus susceptible to significant grasshopper damage. Harvesters of the present invention may allow them to mitigate crop damage from grasshoppers. The farmer benefits from pest control at a low cost, without the use of pesticides. The grasshopper harvester may also be deployed for other crop pests that have a behavior making them susceptible to being caught in the collection array.

Locust swarm mitigation. Larger, more robust harvesters with larger capacities could be stored in areas susceptible to locust swarms (such as Africa and the Middle East). Once an alert for potential locust swarms is given by the organizations that monitor locust swarm formation, these harvesters may be transported to the breeding grounds to reduce locust densities. Locust swarms may be harvested in the nymphal stage when they do not fly and have limited control over their jump trajectory. The harvester is designed to take advantage of its lack of jump control. These grasshopper nymphs can either be processed for food or feed or destroyed.

Rangeland management. Grasshoppers compete with livestock for grass forage. The grasshopper harvester can be deployed as an alternative to chemical pesticide spraying thereby reducing negative environmental impacts.

Grasshopper ranching. The grasshopper harvester may be used to collect grasshoppers from rangeland as protein for human consumption or as feed for livestock or fish. Grasshoppers are 12 times more efficient at converting grass into protein than cattle. Grasshoppers use orders of magnitude less water than cattle. Grasshoppers do not have veterinary bills or transportation costs. (The hoppers may be easily collected and transported). Ranchers benefit from protein production at almost no cost with environmental benefits from reduced water use and sustaining natural grassland habitats. The environmental damage caused by the widespread application of pesticides may be reduced or eliminated. Ultimately, ranchers may grow grasshoppers instead of cattle or grow protein in combinations of cattle and grasshoppers.

The harvester: The harvester may be attached to a wheeled vehicle and may comprise a capture assembly, transfer mechanism, and storage container. Grasshoppers may be collected as they jump, then transferred via a vacuum system into a storage container. If the grasshoppers are to be conserved for food or feed, the storage container may be cooled until the captured grasshoppers are deposited in a processing facility. In some embodiments, the grasshopper harvester may comprise a shredder that kills the grasshoppers and drops the carcasses back onto the soil as a fertilizer.

The harvester may be an attachment, attached to existing farm vehicles such as a tractor, ATV, truck, or other vehicles when grasshopper densities warrant mitigation, then removed from the vehicles when no longer needed. In other embodiments, the grasshopper harvester may be permanently affixed to a vehicle awaiting deployment such as for locust swarms.

The harvester may be attached to an automated, autonomous vehicle. As a non-limiting example, the harvester may be GPS-controlled. The operator may assign each harvester a preprogrammed route depending on the field and harvesting goal. Each harvester may have sensors to be able to avoid obstacles on its own. The harvester may have sensors to determine the load of grasshoppers and/or sensors to determine battery life or fuel available in the gas tank. The harvester may automatically return to a predetermined 'base' once the storage bin is full, or the battery charge/fuel tank drops below a predetermined threshold, whichever comes first. The bin and battery may then be swapped, or the fuel tank refilled so that the harvester can resume harvesting. A single harvester may be deployed, or a fleet of interacting harvesters may be deployed as needed. As a non-limiting example, the fleet of interacting harvesters may function synergistically to capture grasshoppers that jump out of each other's path or even to herd the grasshoppers into a concentrated group for capture. In some embodiments, one or more harvesters may be used in conjunction with one or more herding drones which fly over an area to herd grasshoppers into a concentrated group for capture. In some embodiments, ribbons that hang from the herding drones may cause the grasshoppers to jump away from the ribbons. Causing the grasshoppers to jump may additionally tire them, such that they are more easily captured by the harvester.

Individual harvesters within fleets may communicate location and grasshopper density to each other. The fleet as a whole may operate using swarm artificial intelligence (AI) technology to ensure harvester trajectories maximize capture. The AI may operate both at the level of the fleet, as well as to adjust the speed and direction of individual harvesters based on the densities and jump trajectories of the grasshopper nymphs.

Grasshopper harvesters of the present invention may take advantage of the limited jump control of non-flying grasshoppers and nymphal stages. The jump trajectories differ with species, density, nymphal stage, temperature, cloud cover, plant community, and other biotic and abiotic factors. The harvester may incorporate image analysis to assess the jump trajectories and grasshopper densities. The speed and direction of the harvester may be adjusted by AI to maximize capture as conditions change.

The harvester path may be controlled via a combination of feedback from harvester sensors, AI, GPS, a preprogrammed route or a driver. For organic farmers, this path may ensure that the wheels of the harvester remain in the rows of the organic crop field, to minimize damage to the crops. For ranching grasshoppers, the sensors and route program may ensure areas are skipped to provide future generations of grasshoppers with sustainable harvesting. For locust swarms, the path may move towards the highest densities of locust nymphs to maximize capture.

The embodiments described herein are illustrative, but deployed harvesters may differ from the configuration of the examples shown and described herein, with different control, locomotion, transfer, capture, storage, and/or shredder mechanisms.

Figure 2:
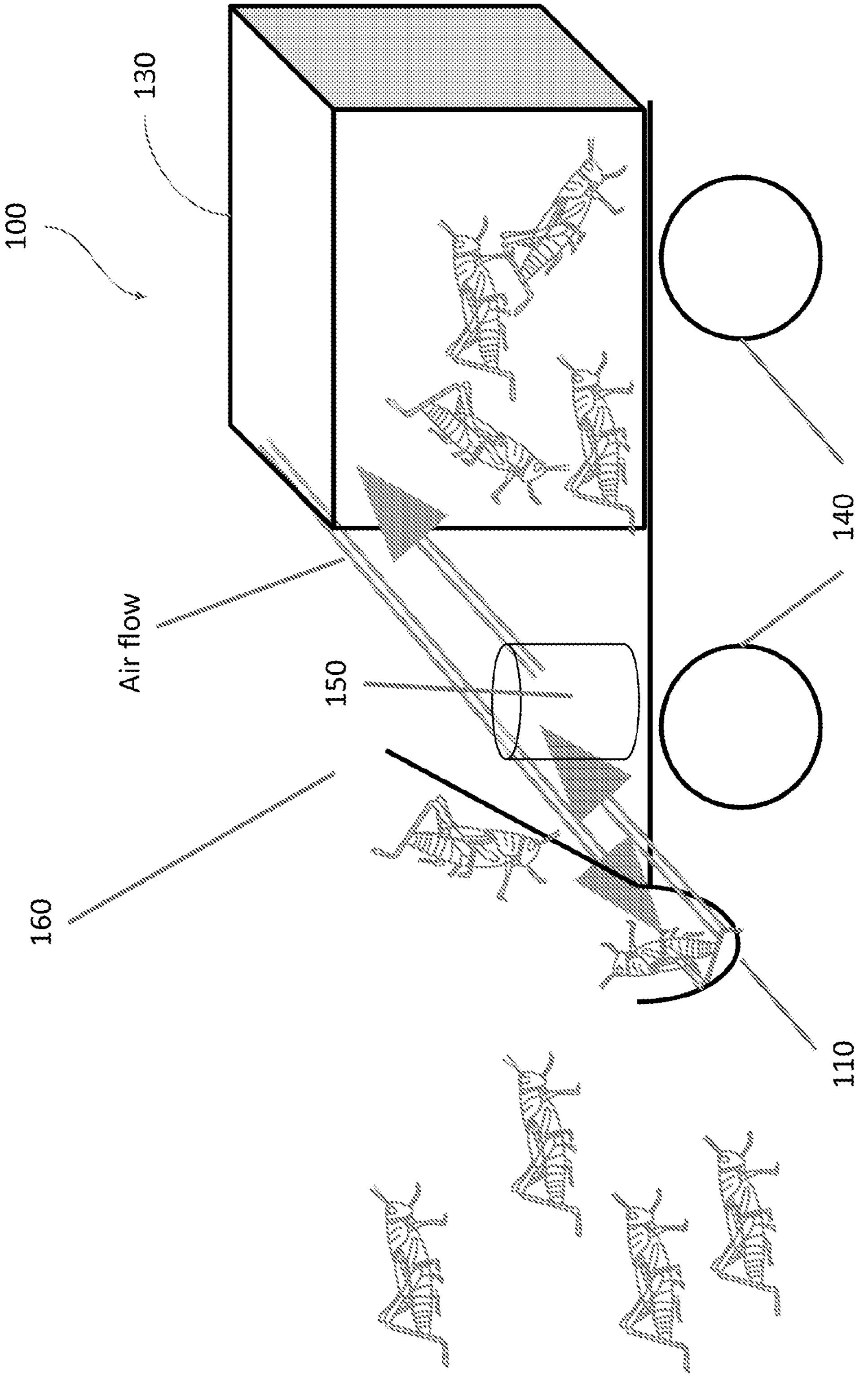
FIG. 2 shows a schematic view of the grasshopper harvesting system of the present invention as an attachment to a GPS controlled vehicle. The power and guidance systems are not shown for simplicity.
Figure 3:
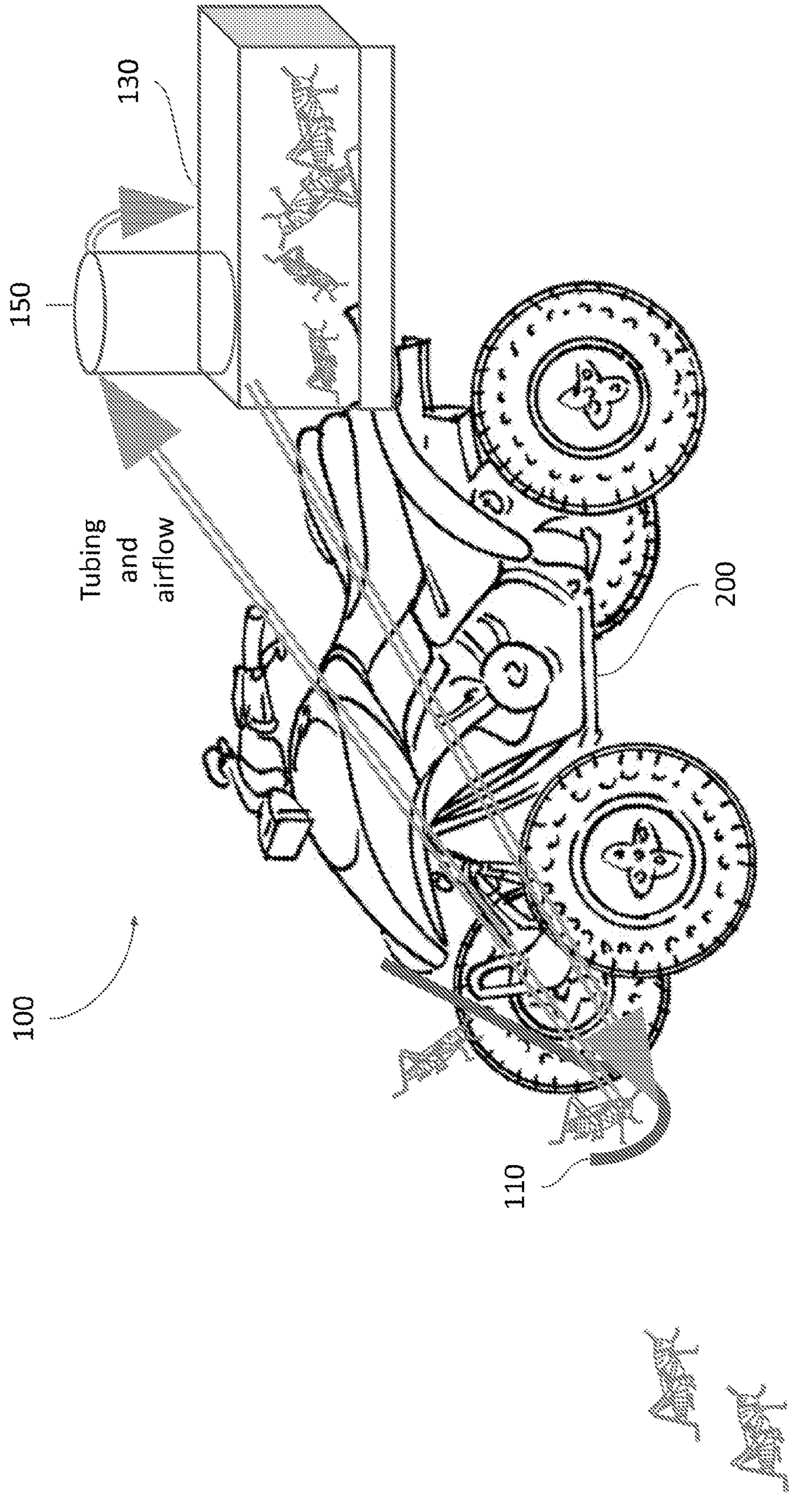
FIG. 3 shows an alternate schematic view of the grasshopper harvesting system of the present invention as an attachment to an ATV or tractor specifically.

FIGS. 1-3 show detailed views of an embodiment of the grasshopper harvesting system (100) of the present invention. The present invention is not limited to the configurations or parts shown in FIG. 1, FIG. 2, or FIG. 3.

In some embodiments, the present invention features a grasshopper harvesting system for collecting grasshoppers for various purposes, such as, but not limited to, protecting crops, such as organically-grown crops, or for consumption purposes. The grasshopper harvesting system may be attached to a vehicle (200) and may comprise a collection device (e.g., a collection array), a transfer mechanism (e.g., a vacuum system (150) and series of tubes or pipes (155), or other conveyor systems), and a storage container for storing the grasshoppers. The storage container is detachable to allow a user to empty the grasshoppers when the bin is full. As an alternative to capturing the grasshoppers for protein, the harvester may feature a shredder to kill the grasshoppers. The shredded grasshoppers can be dropped back to the ground as fertilizer. The system also features a power source, which may comprise a replaceable or rechargeable power source, such as a replaceable battery, a generator, or PTO. The grasshopper system can further comprise a GPS mechanism and a microprocessor. As previously discussed, the microprocessor can be programmed such that the system drives in a predetermined pattern on a field, e.g., based on operator input.

FIG. 1 shows a schematic view of a grasshopper harvesting system. In some embodiments, the grasshopper harvesting system comprises a collection array (e.g., with a backboard), a transfer mechanism (e.g., to transfer the grasshoppers from the collection array), and a storage container and/or shredder. In further embodiments, the grasshopper harvesting system may also include a wheeled vehicle (200).

As depicted in FIG. 1, the present invention features a grasshopper harvesting system comprising a collection array (110). The collection array (110) may comprise a backboard, one or more sideboards, and a baseboard. The backboard, side boards, and baseboard may comprise plastic, metal, or any other rigid material. The collection array (110) may be capable of collecting grasshoppers as the grasshopper harvesting system moves to contact them. A front of the collection array (110) may be left open so that the grasshoppers can jump into the collection array (110). The grasshopper harvesting system may further comprise a vacuum system (150) comprising a suction actuation component, a vacuum inlet, and a vacuum outlet/exhaust (152). The collection array (110) may be fluidly connected to the vacuum inlet of the vacuum system (150) at the baseboard by a first vacuum tubing component (155). The collection array (110) may be fluidly connected to the vacuum outlet of the vacuum system (150) at the baseboard by a second vacuum tubing component. Grasshoppers collected by the collection array (110) may be transported, e.g. suctioned, from the baseboard, through the first vacuum tubing component (155), to the vacuum system (150). Exhaust from the second vacuum tubing component may aid in pushing grasshoppers into the first vacuum tubing component. The grasshopper harvesting system may further comprise a storage container fluidly connected to the vacuum system (150). Grasshopper delivered to the vacuum system (150) may be dispensed into the storage container (130). Note that the storage container (130) is fluidly connected to the vacuum system (150) such that grasshoppers can enter the storage container (130) through the vacuum system (150), but cannot exit the storage container (130) through the vacuum system (150).

In some embodiment, the wheels (140) may be designed to have minimal impact on the crops or soil. For example, in some embodiments, the wheels comprise balloon tires.

According to some embodiments, the present invention features a grasshopper harvesting system (100) for collecting grasshoppers on a field or surface. In some embodiments, the system (100) may comprise a capture assembly (160) comprising sideboards and a backboard. The collection array may sequester grasshoppers that jump into the capture assembly (160) when the system (100) drives on the field or surface. The system (100) may comprise a vacuum system (150) operatively coupled with a bottom surface of the collection array (110), a storage container (130), wherein the vacuum system (150) delivers grasshoppers from the capture assembly (160) to the storage container (130), the storage container is removable, and a power source. In some embodiments, the vacuum system (150) may be operatively coupled with a bottom surface of the capture assembly (160) via one or more vacuum hoses. An exhaust (155) of the vacuum system (150) may serve to push grasshoppers into an inlet of the vacuum system (150). Both an inlet of the vacuum system (150) and an outlet of the vacuum system (150) may be connected to the bottom surface of the capture assembly (160), to create a closed-loop vacuum system (150). The bottom surface of the capture assembly (160) comprises an open trough.

In some embodiments, the system (100) may further comprise a movable cart, an autonomous vehicle, a tractor, an ATV type vehicle, a truck, or any vehicle suitable for rural terrain (200). In some embodiments, the storage container (130) may be disposed on the movable cart. In some embodiments, the storage container (130) may be disposed on a trailer behind the movable cart. In some embodiments, the movable cart may be configured to be remotely controlled.

In some embodiments, the system may further comprise a shredding or grinding component for shredding the collected grasshoppers. The shredding or grinding component may be coupled to or part of the storage container (130). The shredded grasshoppers may be used as a form of fertilizer. In other embodiments, the system can disperse or cast the grasshopper fertilizer onto the ground. For example, the system may further comprise a fertilizer spreader coupled to the shredding or grinding component.

The present invention features a grasshopper harvesting system (100) for collecting grasshoppers on a field or surface. In some embodiments, the system (100) may comprise a vehicle (200), and a capture assembly (160) coupled to the vehicle (200). The capture assembly (160) may comprise a collection array (110) comprising sideboards and a backboard. In some embodiments, the collection array captures grasshoppers that jump into the collection array (110) when the system (100) drives on the field or surface. The collection array may further comprise a transfer system disposed on a bottom surface of the collection array (110) for delivering grasshoppers to the storage container (130). The storage container may be removable. The system (100) may further comprise a power source.

In some embodiments, the wheel system may comprise balloon tires. The system (100) may further comprise a sensor operatively connected to the storage container capable of determining a weight of the storage container. The sensor may be operatively connected to the microprocessor. The microprocessor may cause the system (100) to drive to a particular location when the microprocessor detects that the pressure sensor detects that the storage container is full. In some embodiments, the power source may be a battery, gas generator, or power-takeoff (PTO) of the vehicle (200). In other embodiments, the power source may be a rechargeable battery or a replaceable battery. The system may be used to harvest grasshoppers to protect crops. The system may be used to harvest grasshoppers for consumption purposes.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A grasshopper nymph harvesting system (100) for collecting grasshopper nymphs on a field or surface, said system (100) comprising:

a. a capture assembly (160) comprising sideboards and a backboard, wherein the sideboards and the backboard each comprise a face oriented at an upwards angle relative to the field or the surface, wherein the capture assembly (160) further comprises a trough (110) disposed below the sideboards and the backboard such that the insects impact the sideboards, the backboard, or a combination thereof, and fall into the trough (110), wherein the collection array is configured to sequester the grasshopper nymphs that jump into the capture assembly (160) when the system (100) drives on the field or surface;

b. a vacuum system (150) operatively coupled with a bottom surface of the collection array (110);
wherein both an inlet of the vacuum system (150) and an outlet of the vacuum system (150) are connected to the trough (110) to create a closed-loop vacuum system (150);

c. a storage container (130), wherein the vacuum system (150) is configured to deliver the grasshopper nymphs from the capture assembly (160) to the storage container (130), wherein the storage container is removable; and d. a power source.

2. The system (100) of claim 1, wherein the vacuum system (150) is operatively coupled with a bottom surface of the capture assembly (160) via one or more vacuum hoses, wherein an exhaust (152) of the vacuum system (150) is configured to push grasshopper nymphs into an inlet of the vacuum system (150).

3. The system (100) of claim 1 further comprising a movable cart, an autonomous vehicle, a tractor, an ATV type vehicle, a truck, or any vehicle suitable for rural terrain.

4. The system (100) of claim 3, wherein the storage container (130) is disposed on the movable cart.

5. The system (100) of claim 3, wherein the storage container (130) is disposed on a trailer behind the movable cart.

6. The system (100) of claim 3, wherein the movable cart is configured to be remotely controlled.

7. The system (100) of claim 1, wherein the storage container (130) comprises a shredding component.

8. A grasshopper nymph harvesting system (100) for collecting grasshopper nymphs on a field or surface, said system (100) comprising a vacuum system (150) comprising a backboard and a trough (110) disposed below the backboard such that the insects impact the backboard and fall into the trough (110) wherein the vacuum system (150) is configured to transfer the grasshopper nymphs from the trough (110) to a storage container (130) without killing the grasshopper nymphs, wherein both an inlet of the vacuum system (150) and an outlet of the vacuum system (150) are connected to the trough (110), to create a closed-loop vacuum system (150).

9. The system (100) of claim 8, wherein the system (100) is configured to be coupled with a tractor or all-terrain vehicle.

10. The system (100) of claim 8, wherein the grasshopper nymphs are preserved in a food-grade condition.

11. A grasshopper nymph harvesting system (100) for collecting grasshopper nymphs on a field or surface, said system (100) comprising:

a. a vehicle (200); and b. a capture assembly (160) coupled to the vehicle (200), the capture assembly (160) comprising:

i. a collection array (110) comprising sideboards and a backboard, wherein the sideboards and the backboard each comprise a face oriented at an upwards angle relative to the field or the surface, wherein the capture assembly (160) further comprises a trough (110) disposed below the sideboards and the backboard such that the insects impact the sideboards, the backboard, or a combination thereof, and fall into the trough (110), wherein the collection array (110) is configured to capture the grasshopper nymphs that jump into the collection array (110) when the system (100) drives on the field or surface;

ii. a plurality of conveyor systems disposed in a bottom surface of the collection array (110);

iii. a vacuum system (150) configured to apply suction to the collection array (110) such that the grasshopper nymphs are transferred from the collection array (110) to the plurality of conveyor systems, wherein the plurality of conveyor systems are configured to deliver the grasshopper nymphs from the collection array (110) to a storage container (130), wherein the storage container (130) is removable;

wherein both an inlet of the vacuum system (150) and an outlet of the vacuum system (150) are connected to a bottom surface of the capture assembly (160), to create a closed-loop vacuum system (150); and iv. a power source.

12. The system (100) of claim 11, wherein the vehicle (200) comprises balloon tires.

13. The system (100) of claim 11 further comprising a sensor operatively connected to the storage container (130), configured to determine a weight or volume of the storage container (130).

14. The system (100) of claim 13, wherein the sensor is operatively connected to a microprocessor.

15. The system (100) of claim 14, wherein the microprocessor is configured to cause the system (100) to drive to a particular location when the microprocessor detects that the sensor detects that the storage container (130) is full.

16. The system (100) of claim 11, wherein the power source is a rechargeable or replaceable battery, gas generator, or power-takeoff (PTO) of the vehicle (200).

17. The system (100) of claim 11, wherein the storage container comprises a shredder.

* * * * *